United States Patent
Asghar et al.

(10) Patent No.: US 6,213,185 B1
(45) Date of Patent: Apr. 10, 2001

(54) FEEDER FOR OUTSERTS AND OTHER ARTICLES

(75) Inventors: Syed Ali Asghar; Mark G. Larson, both of Milwaukee; Bruce L. Heard, New Berlin; Clifford A. Boals, South Milwaukee, all of WI (US)

(73) Assignee: Krones, Inc., Franklin, WI (US)

( * ) Notice: Subject to any disclaimer, the term of this patent is extended or adjusted under 35 U.S.C. 154(b) by 0 days.

(21) Appl. No.: 09/170,407

(22) Filed: Oct. 13, 1998

(51) Int. Cl.[7] .......................................................... B31F 5/00
(52) U.S. Cl. .......................... 156/556; 156/566; 156/569; 156/DIG. 27; 221/75; 198/625
(58) Field of Search ................................... 156/556, 566, 156/569, DIG. 24, DIG. 27, DIG. 28, DIG. 37, DIG. 34; 221/75; 198/625, 467.1; 414/795.1

(56) References Cited

U.S. PATENT DOCUMENTS

| | | | |
|---|---|---|---|
| 3,841,946 | * 10/1974 | Carter | 198/625 X |
| 4,378,938 | * 4/1983 | Staniszewski | 271/179 |
| 4,547,114 | * 10/1985 | Watrous et al. | 198/625 X |
| 4,957,409 | * 9/1990 | Fukao et al. | 414/788.4 |
| 5,058,725 | * 10/1991 | Gamberini et al. | 198/406 |
| 5,163,073 | * 11/1992 | Chasteen et al. | 377/8 |
| 5,407,057 | * 4/1995 | Baranowski | 198/448 |
| 5,785,803 | * 7/1998 | Schiessl | 156/538 |

\* cited by examiner

*Primary Examiner*—Richard Crispino
*Assistant Examiner*—Sue A. Purvis
(74) *Attorney, Agent, or Firm*—Ryan Kromholz & Manion, S.C.

(57) ABSTRACT

In a device for feeding articles, cylindrical feed screws having left and right hand pitched helical grooves are arranged in parallel and are driven rotationally in opposite directions such that an article deposited in the space between the roots of the grooves at one corresponding end of the grooves will be advanced axially to the opposite ends for exiting from between the feed screws.

5 Claims, 5 Drawing Sheets

FEEDER FOR OUTSERTS AND OTHER ARTICLES

BACKGROUND OF THE INVENTION

The invention disclosed herein pertains to a device for feeding articles automatically and will be illustrated herein as performing the function of feeding outserts for application to containers although the device can feed a variety of other articles as well.

Outserts, which are actually folded strips of literature, are commonly applied to pharmaceutical containers to inform a purchaser of proper dosages and contraindications, for example. The conventional way of adhering outserts to containers or their cartons is to transport the articles along a horizontal plane in the course of which glue is applied to a surface of the article so it can pick up by adhesion an outsert that is presented toward the article from a spring biased stack in a magazine channel. The traditional feeding method requires critical adjustment. A spring that pushes the stack of outserts toward the adhesion coated side of the moving article tends to apply a lesser and lesser pushing force on the stack or row of outserts as the stack approaches depletion so that it must be reloaded in the magazine. It is also problematical in conventional practice to gate the outserts from the exit end of the magazine in a stable and controlled fashion. As the outserts arrive consecutively at the output gate they must be restrained so that the force of the pusher spring does not push an outsert out of the gate when the container has not arrived at that point yet. The penalty for unstable outsert feeding under prior practice is that the feeding rate and, hence, the production rate of articles could be lower than it could otherwise be if springs and pneumatic or hydraulic pushers could be dispensed with.

Another preexisting method of applying outserts to containers involves picking up the outserts with an adhesive belt, applying adhesive to the outsert and tacking it onto the article. This procedure has the handicap of the preexisting procedure outlined above where there is no positive gripping control over the outsert before it is pressed onto and adhered to the article.

SUMMARY OF THE INVENTION

The problems and uncertainty in guiding, holding and pressing outserts onto containers using prior procedures are overcome with the new article feeder constituting the invention. The new feeder allows high speed feeding of outserts or other articles and maintains stable control over the outsert or other article until it is applied to a container.

According to the invention, outserts or other articles are fed from a source to a point of utilization by means of a pair of feed screws that are arranged in juxtaposition with each other for rotating about parallel axes. Each screw is basically a solid cylinder in which there is an axially advancing helical groove. The peripheries of the screws may be spaced laterally from each other which means that the grooves on one feed screw are mated with the grooves on an adjacent feed screw to provide a space for insertion of an item such as an outsert with part of the item is captured in each helical groove. As the feed screws rotate, they advance the inserted outserts axially from an insertion point to an exit point where they come to a tentative stop in timed relationship with the advancing adhesive treated container to provide for the container sweeping the outsert from the ends of the screws while the screws are in fact still applying a compressive force to the outserts as they are applied to the containers.

How the new article feeder device is constructed and functions will now be described in greater detail in reference to the accompanying drawings.

DESCRIPTION OF THE DRAWINGS

FIG. 5 is a transverse vertical sectional view taken on a line corresponding to the line 5—5 in FIG. 3;

FIG. 6 is an end elevational view of the new article feeder taken on a line corresponding with the line 6—6 in FIG. 3;

DESCRIPTION OF A PREFERRED EMBODIMENT

Figure 1:
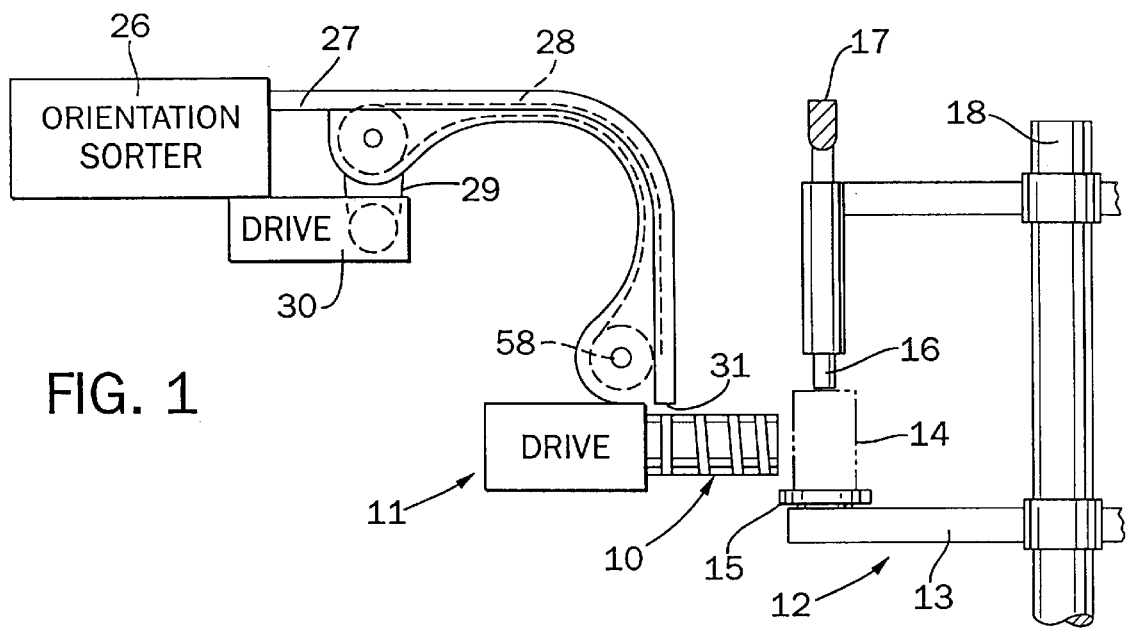
FIG. 1 is a diagrammatic view of a system in which the new article feeder can be used.

In FIG. 1, the new article feeder is shown diagrammatically and is designated generally by the numeral 10. The drive mechanism for the feeder is designated generally by the numeral 11. The feeder, in this example, is positioned next to a turntable 12 which exhibits one of a plurality of article transfer stations. The turntable comprises a base or circular platform 13 turning with a shaft 18. A container 14, which may be a can, bottle, carton or other object to which literature in the form of an outsert is applied, is supported on one of a plurality of equiangularly spaced apart disks 15 which orbit in a circular path as the turntable turns. When the force of applying an outsert is exerted by the outsert feeder 10, the object 14 to which the outsert is applied is stabilized by a conventional vertically reciprocable centering and restraining member 16 by way of example and not limitation. A stationary cam 17 of suitable circumferential length drives restraining member 16 down to hold container 14 as soon as the container is deposited on a support disk 15. A restraining member 16 is associated with each container supporting disk 15. The containers could be transported with known types of in-line conveyors as well as with a turntable.

Figure 8:
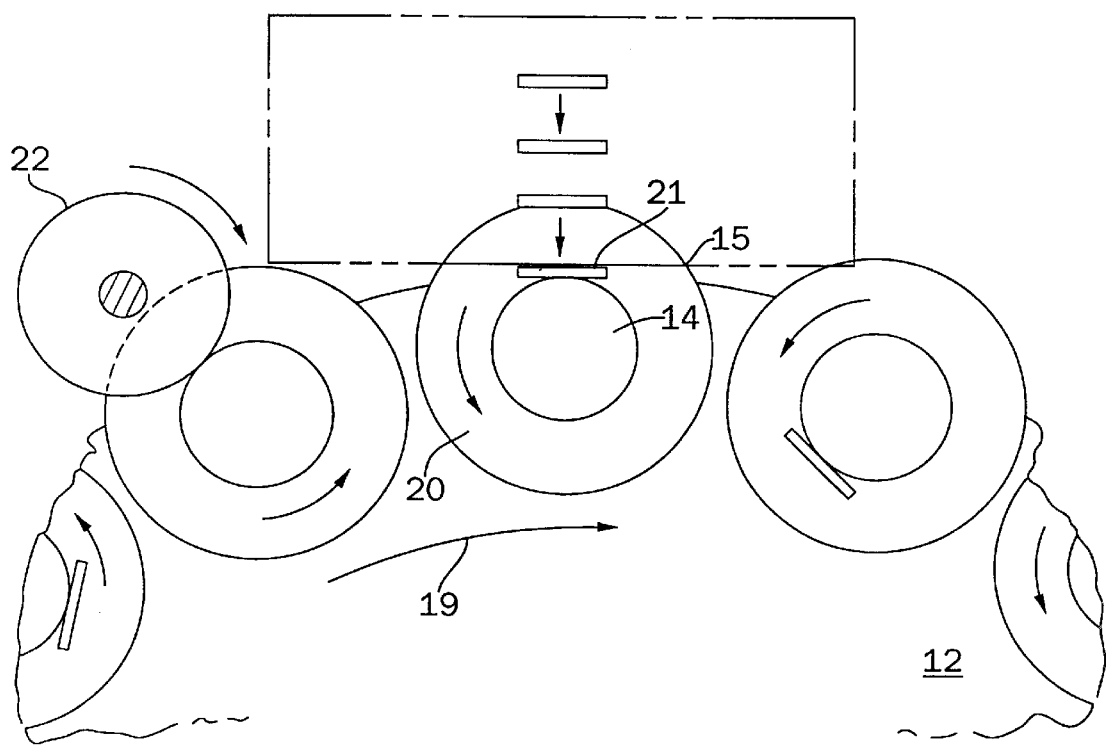
FIG. 8 is a diagram showing part of a turntable on which containers are transported for having outserts applied to them in succession.

One system utilizing the new feeder 10 is outlined diagrammatically in FIG. 8 where the turntable has its previously assigned reference numeral 12. Because the turntable is rotating about a vertical axis in the direction of the arrow 19, the container supporting disks 15 are orbiting in a corresponding direction. The disks may also be rotating as indicated by the arrows 20. One container to which the numeral 14 is applied in FIG. 8 is presently at a station where an outsert 21 is being applied to and adhered to a round container 14. As the containers 14 arrive on the turntable and proceed along their orbital path, they encounter a conventional glue roller 22 which contacts the container and puts a strip of glue on it. Hence when the container 14 arrives at the application station the outsert 21 has to simply be put into adhesive contact with the container.

Figure 10:
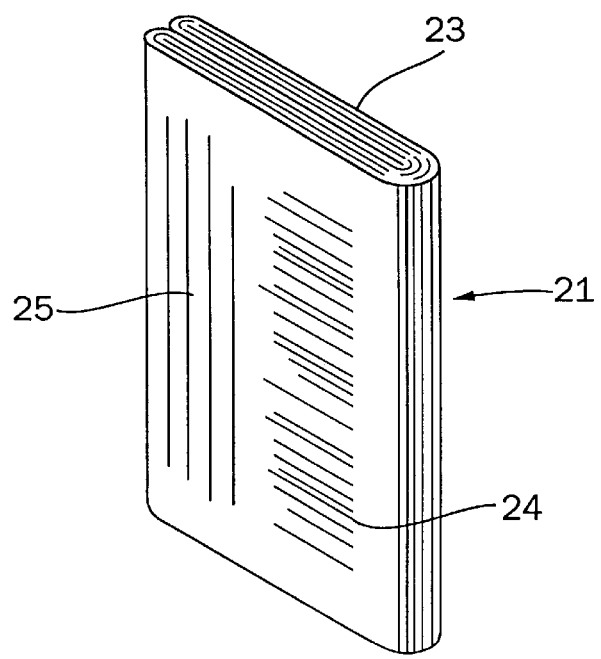
FIG. 10 is a perspective view of a sample outsert.

A perspective view of an illustrative outsert 21 is presented in FIG. 10. This outsert is comprised of folded layers of paper 23, constituting informative literature that relates to the product to which the outsert is applied. The outsert typically has a bar code 24 and possibly other information 25 printed on it. The surface of the outsert opposite of the surface that is visible in FIG. 10 may have the same information printed on it. This eliminates a need for being careful to apply the outsert so that the data on one of the surfaces can be read without detaching it from a container.

Before proceeding with a more detailed description of the article feeder, attention is invited again to one kind of system in FIG. 1 wherein the new article feeder 10 is utilized. In this Figure, a conveyor, not shown, conveys outserts randomly from a storage bin, not shown, into an orientation sorter marked 26. This sorter is commercially available from a vendor and is not an inventive feature of the new article feeder. The sorter has the capability of orienting the outserts fed into it all in an identical orientation as they are discharged from the sorter onto a conveyor 27. The conveyor comprises a closed loop belt 28 that is driven by a toothed belt 29 and a servomotor drive 30. Hence, when the outserts are discharged from the end 31 of the conveyor they drop in an identical orientation into the new article feeder 10.

Figure 3:
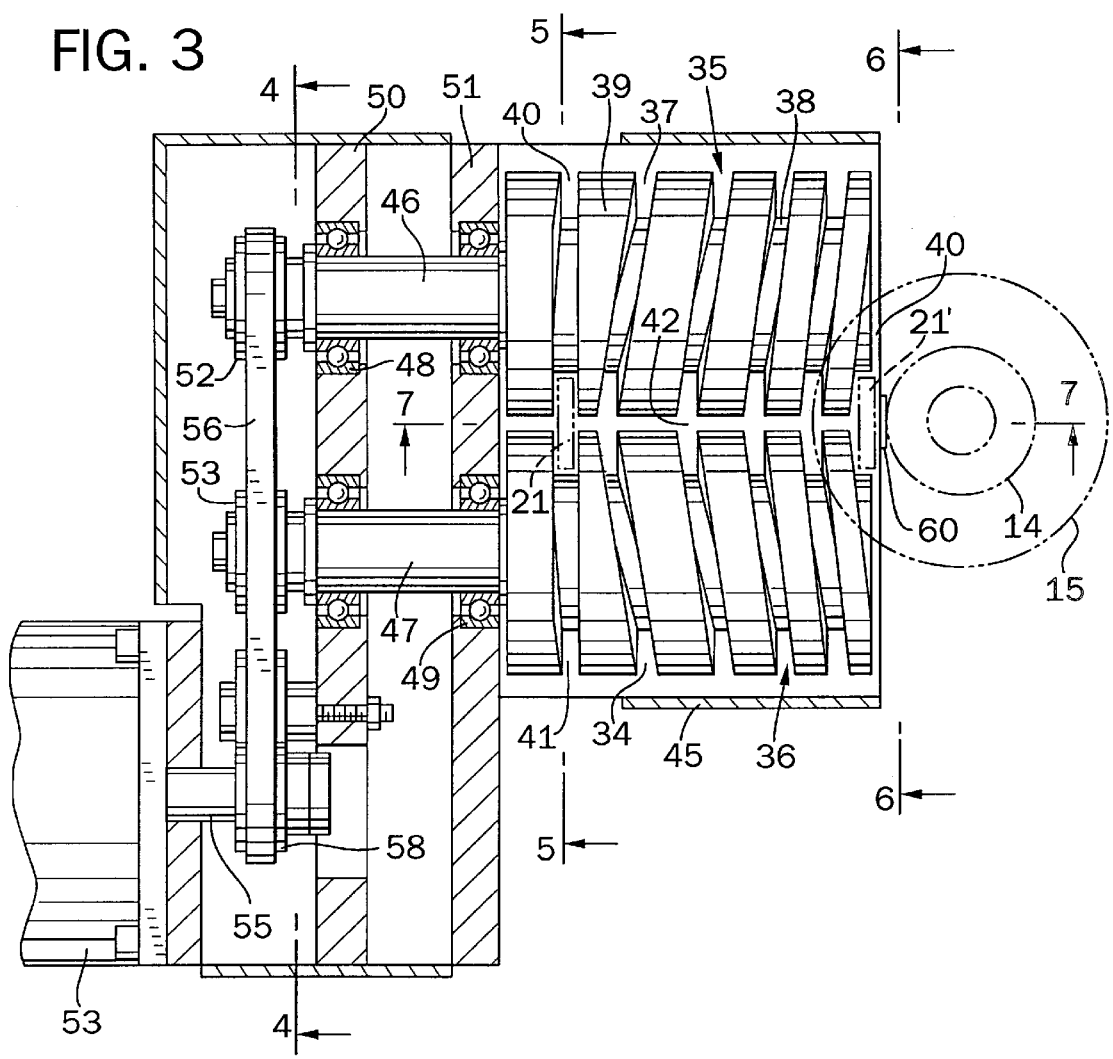
FIG. 3 is a transverse vertical sectional view taken on a line corresponding to the line 3—3 in FIG. 2.

The new article feeder will now be described in greater detail by first focusing on FIG. 3. This figure shows that the article feeder is comprised of adjacent feed screws which are generally designated by the numerals 35 and 36. Typical feed screw 35 is comprised of a cylindrical body containing a continuous helical groove 37. The radial depth of the helical groove is usually preferably uniform throughout its length. The width of the groove is also usually preferably uniform throughout its length. These uniformities exist in the illustrative embodiment. The pitch from turn to turn of the groove 37 may be uniform throughout the length of the helical groove or, as in the FIG. 3 example, the pitch decreases from the trailing end 39 to the leading end 40 of the groove for reasons to be explained. The article feeder screw 35 can be perceived from its top view in FIG. 3 as having a left hand pitch. The other cooperating feed screw 36 is similar to feed screw 35 except that the helical groove 34 of feed screw 36 has a right hand pitch. As shown in phantom lines in FIG. 3, an outsert 21 is presently deposited in the cooperating article infeed ends 40 and 41 of the helical grooves 37 and 34 of the respective article feed screws 35 and 36. The depth of the root 38 of the helical groove 37 of feed screw 35 is the same as the depth of the root of the helical groove 34 in feed screw 36. This is appropriate for feeding articles such as outserts 21 which are symmetrical. The axially extending space 42 between the peripheries of the adjacent feed screws 35 and 36 has a width such that the side edges of the outsert 21 are substantially coincident with the roots of the grooves. It will be evident in FIG. 3 that if the cylindrical feed screws 35 and 36 are driven rotationally in opposite directions, outsert 21 shown in the infeed ends 40 and 41 of grooves 37 and 34 will be advanced axially of the screws for the outserts to finally arrive at the outsert exit of the feeder device where the outsert is marked 21'. The outsert 21' is in a position where its leading surface, that is, its right hand surface in FIG. 3, is in contact with the periphery of container or bottle 14. Since the container 14 has a strip of glue, not visible, applied to it, and the container 14 is rotating, the outsert 21 will adhere to the container for being transported away from the exit end of the feeder to allow for the next container to become positioned at the outsert application station.

It should be observed in FIG. 3 that in this illustrative embodiment, the pitch of the helical grooves in the cylindrical feed screws 35 and 36 decreases as one progresses from the trailing end portions 40 and 41 of the grooves to the leading end portions or exit where the outsert 21' has reached its limit of axial travel. This continuous decrease in the pitch of the helical grooves accomplishes rapid axial advance of the outsert at first and finally a deceleration or decrease in the axial advance until arrival at the outlet of the feeder where outsert 21' is presently positioned stationarily in FIG. 3. Of course, in some applications the pitch can be uniform over the length of the helix.

Figure 4:
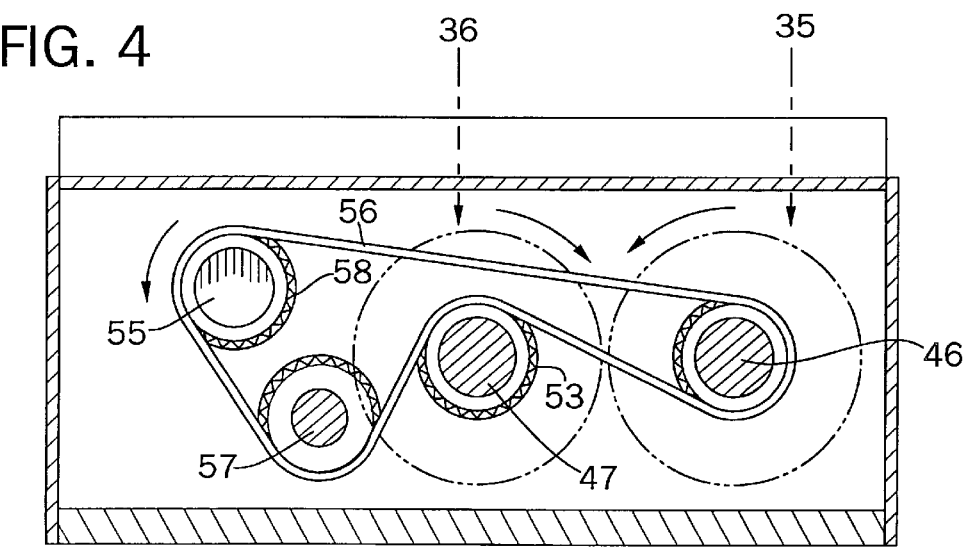
FIG. 4 is a transverse vertical sectional view taken on a line corresponding to the line 4—4 in FIG. 3.

The feeder in FIG. 3 further comprises a guide housing 45. Feed screw 35 has a shaft 46 and feed screw 36 has a shaft 47. The shafts are journaled in bearings such as those marked 48 and 49 and are mounted in rigid plates 50 and 51. Shaft 46 has a toothed pulley 52 fastened to it and shaft 47 has a toothed pulley 53 fastened to it. A servomotor 54 has a shaft 55 which drives the feed screws 35 and 36 rotationally through the agency of a toothed belt 56 which is shown in FIG. 4 to be engaged with the toothed pulleys 52 and 53 on the respective feed screw shafts 46 and 47. A shaft 57 has an idler sprocket 58 fixed to it. The motor position is adjustable by a limited amount to effect tightening of the belt 56. The motor shaft 55 also has a toothed pulley 58 fastened to it for driving the belt and, hence, the feed screw shafts 46 and 47.

Figure 2:
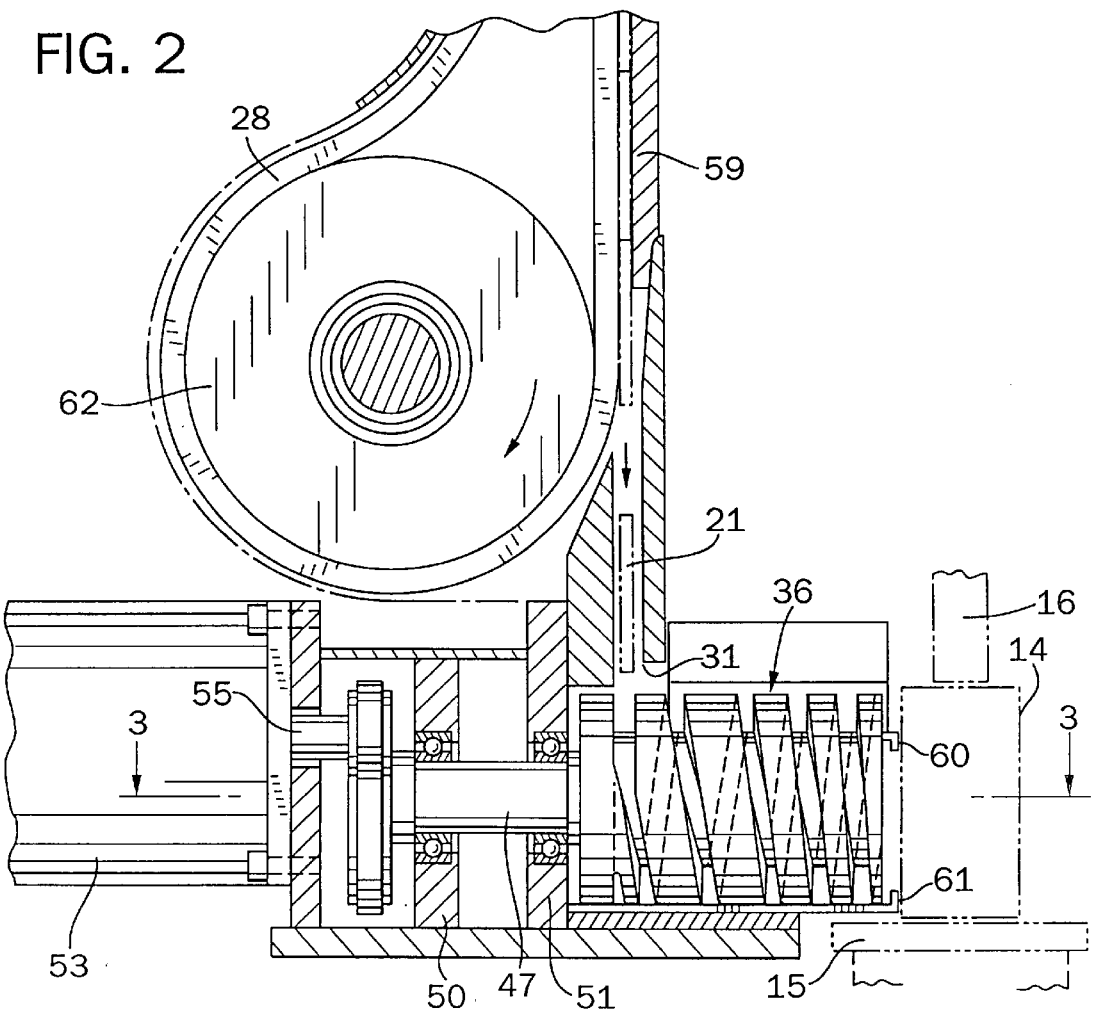
FIG. 2 is an enlarged and more detailed side elevational view of the feeder, partly in section.

FIG. 2 shows how the conveyor belt 28 feeds outserts 21 consecutively into the trailing ends of the grooves in the respective feed screws 36 and 37. One of the toothed pulleys 62 on which the toothed conveyor belt 28 runs allows for having a guide 59 that captures and guides outserts 21 between belt 28 and guide 59 for accurate discharge of the outserts through exit opening 31 into the trailing ends 40 and 41 of the screws. FIG. 2 shows the profiles of a pair of retainer elements having outsert retaining rims 60 and 61 which tentatively and releasably retain outserts that have been transported to the limits of the feed screws and thus to the outsert exit point of the feed screws. The purpose of this is to maintain physical control over the outserts until they become controlled by adhesion to the container 14 to which they are applied.

Figures 5, 6:
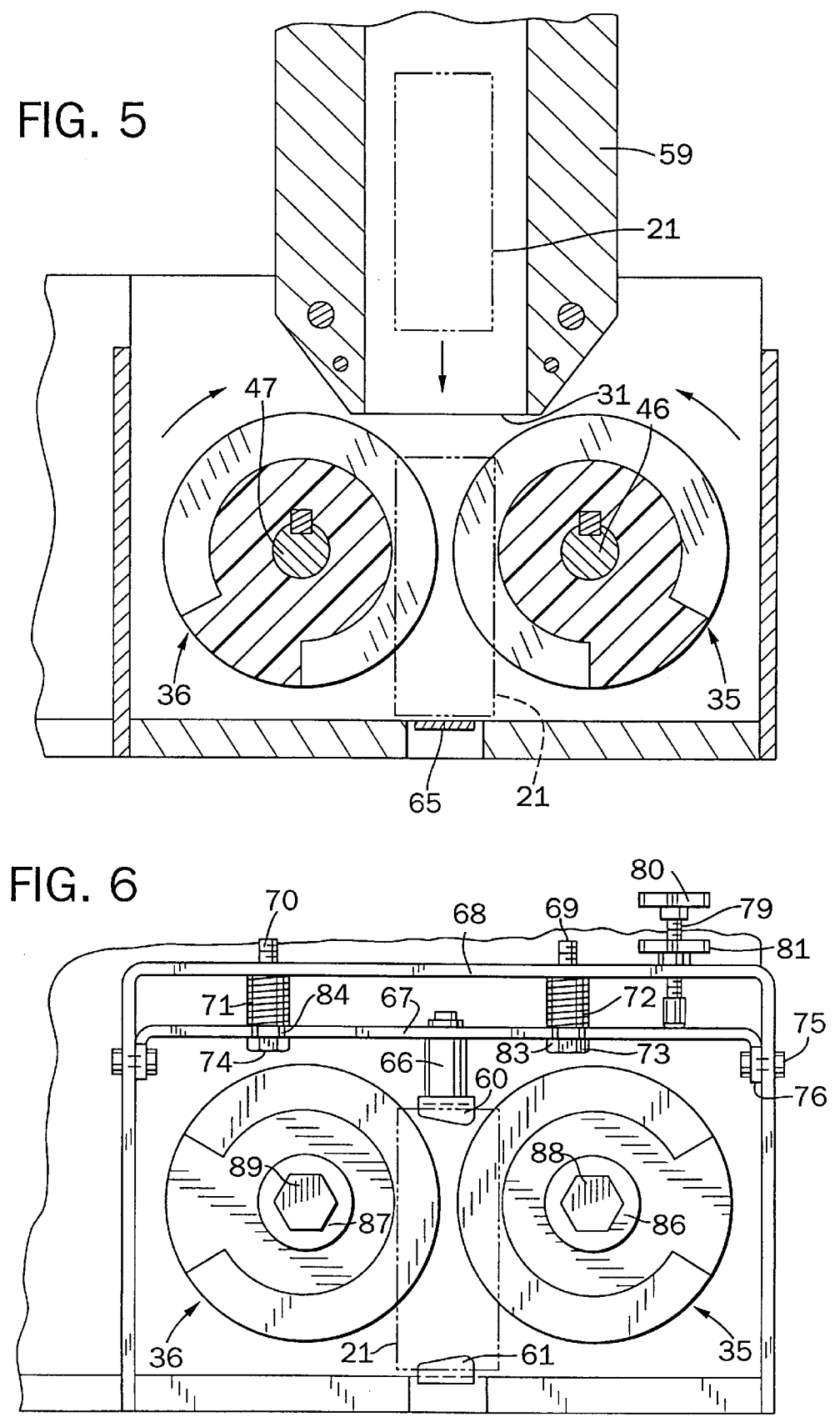

FIG. 5 shows a lower stop element 65 which restrain the outserts 21 at the proper level between the helically grooved feed screws 35 and 36. FIG. 6 shows the previously mentioned outsert restraining elements 60 and 61 at the outsert exit end of the feed screws. The space between tentative restraining rims 60 and 61 must be adjusted with considerable precision so that the outserts are not restrained to the extent that the adhesive or glue on the containers would not pull them out nor should they be adjusted for being restrained so loosely that complete control over the attitude and position of the outserts would be sacrificed. The upper retaining element having rim 60 is adapted for being adjustable up and down. Various views of the adjustment elements are depicted in FIGS. 6, 7, and 9.

Figure 7:
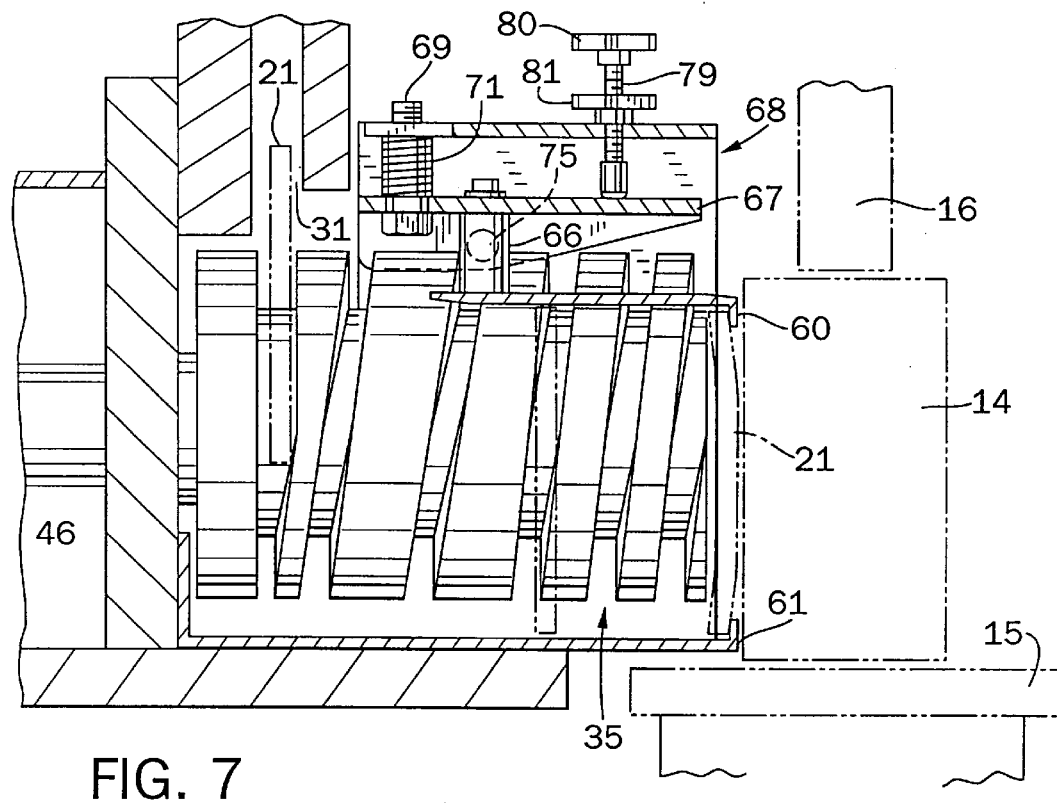
FIG. 7 is a side elevational view of one of the article feed screws showing how it is associated with elements for adjusting the degree of restraint of the article when it is presented for being attached to a container.
Figure 9:
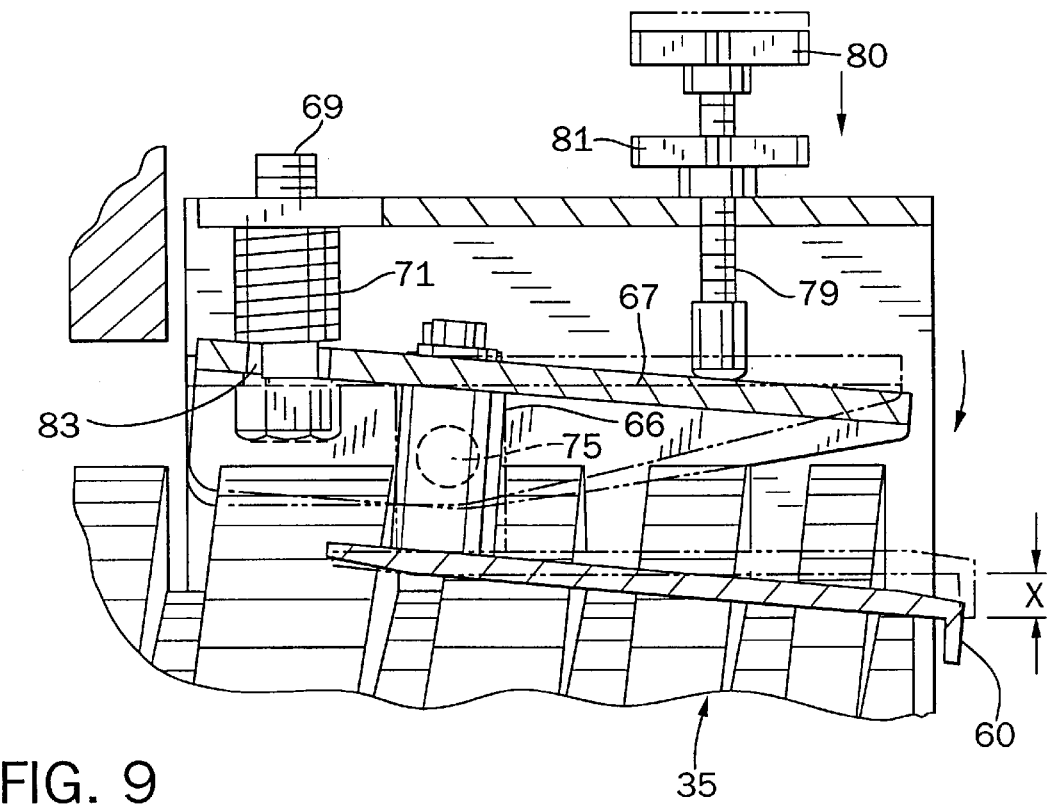
FIG. 9 is a fragmentary magnified view of the adjustment device depicted in FIG. 7.

FIGS. 7 and 9 illustrate that the upper outsert restraining element having rim 60 is supported on studs 66 which are, in turn, mounted to a tiltable plate 67. Tiltable plate 67 is mounted to an angle bracket 68 which supports the plate 67 loosely on studs 69 and 70. The studs are surrounded by springs 71 and 72. The tiltable plate 67 can tilt on heads 73 and 74 of studs 69 and 70, respectively, as is evident in FIG. 6. One may see in FIG. 6 that the side plate bracket 68 has studs such as the one marked 75, mounted to it. Also the bent down side walls of the tilting plate 67 pivot on the studs 76 to allow guided tilting of plate 67. The amount of tilt is established by an adjustment screw whose threaded stem 79 is screwed into plate 68 and has its tip there pressed against tilting plate 67. There is a lock nut 81 on the threaded stem 79 for holding the screw 79 in adjusted position. In FIG. 7, the adjustment device is adjusted appropriately for the particular sized outsert that is being handled. In FIG. 9 the adjustment parts are shown magnified for the sake of clarity. Here one may see that the tiltable plate 67 has upper outsert retaining element 60 mounted rigidly to it and that plate 67 is provided with clearance holes 83 and 84 through which the body of studs 69 and 70 pass freely to allow tilting of plate 67 while being stabilized by spring 71 and 72.

FIG. 6 shows that the end of feed screws 35 and 36 are counterbored as at 86 and 87 so that the machine screws 88 and 89 that secure the feed screws 35 and 36 to shafts 46 and 44 are recessed below the article output ends of the screws. The surfaces at the ends of the feed screws surrounding the counterbores are smooth and flat so that when an outsert or other article comes off the output ends of the grooves the outsert is not pushed further axially in the grooves but is backed up by the end surfaces while being stabilized against ledges 60 and 61 so the conveyed container's adhesive area can exert a compressive force on the outsert.

We claim:

1. An outsert feeder comprising:

two cylindrical feed screw bodies in one of which there is a left hand axially extending helical groove and in the other of which there is a right hand axially extending groove, the bodies being supported adjacent each other for being rotatable about parallel axes with their grooves facing each other, corresponding first end regions of the respective grooves cooperating with each other to form an outsert infeed region and corresponding second end regions of the respective grooves axially displaced from the first end regions cooperating to form an outsert output region, rotation of the feed screw bodies about said axes causing an outsert that is deposited in the infeed region and is engaged by said cooperating grooves to be pushed to the end of the grooves at said output region, and mechanism for operatively coupling the cylindrical feed screw bodies to a power source to effect rotation of the bodies about their axes in opposite directions but toward each other, and, a conveyor for conveying objects including containers to which an outsert is to be applied in a predetermined path past said output region, a device for applying glue to said containers before they arrive in succession at the output region to provide for the adhesive to contact and adhere to an outsert at said output region and to withdraw the outsert from the feeder.

2. An outsert feeder according to claim 1 in combination with a conveyor, said conveyor being constructed for conveying a series of outserts and arranged for discharging outserts into said infeed region.

3. Apparatus according to claim 1 including:

at least one outsert temporary retaining element fixed adjacent the helical grooves where they end at the output region most remote from the infeed region and said retaining element having a rim arranged for holding an outsert at the output region only sufficiently for allowing the outsert to be withdrawn by contacting the adhesive on the container.

4. Apparatus according to claim 3 including another outsert retaining device having an adjustable element with a rim for cooperating with the at least one element to retain said outsert temporarily until the outsert is picked up by the adhesive on a container, the device comprising:

a bracket fixed proximate the cylindrical bodies, an arm mounted for pivoting on a horizontal axis, a plate element fastened to the arm and terminating in a second rim disposed in a position for cooperating with said at least one rim to retain an outsert, spring means interposed between the arm and the bracket, and an adjustment screw threaded into the bracket and having a tip bearing to provide for rocking the arm on its pivot in opposition to the force of the spring means to thereby adjust the distance between the second rim and the first rim to set the retaining force on the outsert that is at the output region.

5. Apparatus according to claim 1 wherein the pitch of each helical groove decreases by the same amount proceeding from said first end region of the groove toward the second end region.

\* \* \* \* \*